United States Patent
Wang et al.

(10) Patent No.: US 11,653,363 B2
(45) Date of Patent: May 16, 2023

(54) METHOD AND DEVICE FOR TRANSMITTING DOWNLINK CHANNEL

(71) Applicant: CHINA ACADEMY OF TELECOMMUNICATIONS TECHNOLOGY, Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/609,198

(22) PCT Filed: Apr. 4, 2018

(86) PCT No.: PCT/CN2018/081888
§ 371 (c)(1),
(2) Date: Oct. 28, 2019

(87) PCT Pub. No.: WO2018/196576
PCT Pub. Date: Nov. 1, 2018

(65) Prior Publication Data
US 2020/0059910 A1 Feb. 20, 2020

(30) Foreign Application Priority Data
Apr. 28, 2017 (CN) .......................... 201710299306.5

(51) Int. Cl.
*H04W 76/11* (2018.01)
*H04L 1/00* (2006.01)
(Continued)

(52) U.S. Cl.
CPC ........... *H04W 72/23* (2023.01); *H04L 1/0061* (2013.01); *H04W 68/005* (2013.01);
(Continued)

(58) Field of Classification Search
None
See application file for complete search history.

(56) References Cited

U.S. PATENT DOCUMENTS

2011/0141941 A1 6/2011 Lee et al.
2015/0029875 A1 1/2015 Zhu et al.
(Continued)

FOREIGN PATENT DOCUMENTS

CN 102113243 A 6/2011
CN 102333381 A 1/2012
(Continued)

OTHER PUBLICATIONS

First office action and search report from CN app. No. 201710299306.5, dated Mar. 6, 2020, with English translation from Global Dossier.
(Continued)

*Primary Examiner* — Hong Shao
(74) *Attorney, Agent, or Firm* — Ladas & Parry, LLP

(57) ABSTRACT

Provided in the present disclosure are a method and device for transmitting a downlink channel. The method for transmitting a downlink channel includes: notifying a UE of a resource set for transmission of a group common PDCCH. The solution of the present disclosure enables the UE to ascertain a resource location for detection and reception of a group common PDCCH, thereby detecting and receiving the group common PDCCH at the resource location of the group common PDCCH.

20 Claims, 3 Drawing Sheets acquiring a resource set of a base station for transmission of a group common PDCCH  401

(51) Int. Cl.
H04W 68/00 (2009.01)
H04W 80/08 (2009.01)
H04W 72/04 (2023.01)
H04W 72/23 (2023.01)
H04L 5/00 (2006.01)

(52) U.S. Cl.
CPC ............ *H04W 76/11* (2018.02); *H04W 80/08* (2013.01); *H04L 5/0007* (2013.01)

(56) References Cited

U.S. PATENT DOCUMENTS

| | | | |
|---|---|---|---|
| 2015/0237459 A1 | 8/2015 | Webb et al. | |
| 2015/0341918 A1* | 11/2015 | Yang | H04W 68/005 370/312 |
| 2016/0150510 A1 | 5/2016 | Shao et al. | |
| 2016/0249337 A1 | 8/2016 | Liang et al. | |
| 2018/0279289 A1* | 9/2018 | Islam | H04W 72/0446 |
| 2019/0349904 A1* | 11/2019 | Kwak | H04W 72/042 |
| 2020/0015261 A1* | 1/2020 | Takeda | H04W 72/0446 |
| 2020/0059910 A1 | 2/2020 | Wang et al. | |

FOREIGN PATENT DOCUMENTS

| | | |
|---|---|---|
| CN | 102368759 A | 3/2012 |
| CN | 104521168 A | 4/2015 |
| CN | 105359429 A | 2/2016 |
| CN | 105846977 A | 8/2016 |
| CN | 106211086 A | 12/2016 |
| JP | 2016506135 A | 2/2016 |
| WO | 2014087147 A1 | 6/2014 |
| WO | 2014177095 A1 | 11/2014 |
| WO | 2018196576 A1 | 11/2018 |

OTHER PUBLICATIONS

Extended European Search Report from EP app. No. 18791815.6, dated Mar. 24, 2020.
International Search Report from PCT/CN2018/081888, dated Jun. 26, 2018, with English translation from WIPO.
Written Opinion of the International Searching Authority from PCT/CN2018/081888, dated Jun. 26, 2018, with English translation from WIPO.
International Preliminary Report on Patentability from PCT/CN2018/081888, dated Oct. 29, 2019, with English translation from Global Dossier.
"Final Report of 3GPP TSG RAN WG1 #88 v1.00 (Athens, Greece, Feb. 13-17, 2017)", R1-1704172, 3GPP TSG RAN WG1Meeting #88bis, Spokane, USA, Apr. 3-7, 2017.
"Common PDCCH", R1-1702377, 3GPP TSG RAN WG1 Meeting #88, Athens Greech, Feb. 13-17, 2017.
"Views on structure of group-common PDCCH", R1-1705735, 3GPP TSG RAN WG1Meeting #88bis, Spokane, USA, Apr. 3-7, 2017.
"On 'Group Common PDCCH' Structure and Configuration", R1-1706028, 3GPP TSG RAN WG1Meeting #88bis, Spokane, USA, Apr. 3-7, 2017.
"On Group Common PDCCH", R1-1718629, 3GPP TSG-RAN WG1 Meeting #90bis, Prague, Czech Republic, Oct. 9-13, 2017.
Second Office Action and search report from CN app. No. 201710299306.5, dated Aug. 18, 2020, with English translation provided by Global Dossier.
"On 'Group Common PDCCH'", R1-1703283, 3GPP TSG-RAN WG1 #88, Athens, Greece, Feb. 13-17, 2017.
"Group Common PDCCH design", R1-1704443, 3GPP TSG RAN WG1 Meeting #88bis, Spokane, USA, Apr. 3-7, 2017.
Notice of Reason for Refusal from JP app. No. 2019-558487, dated Dec. 22, 2020, with English translation provided by Global Dossier.
Notification of Reason for Refusal from KR app. No. 10-2019-7035061, dated Nov. 24, 2020, with English translation provided by Global Dossier.
Notice of Reasons for Refusal from JP app. No. 2019-558487, dated Sep. 28, 2021, with English translation from Global Dossier, all pages.
"Further design of group common PDCCH for NR", R1-1705531, 3GPP TSG RAN WG1 Meeting #88bis, Spokane, USA Apr. 3-7, 2017, all pages.
Notice of Final Rejection from KR app. No. 10-2019-7035061, dated Jul. 30, 2021, with English translation from Global Dossier, all pages.
"Use of multiple numerologies in NR", R1-167439, 3GPP TSG RAN WG1 Meeting #86, Gothenburg, Sweden Aug. 22-26, 2016, all pages.
"NR synchronization signal and DL broadcast signal", R1-1609701, 3GPP TSG RAN WG1 Meeting #86bis, Lisbon, Portugal 10th-146th Oct. 2016, all pages.
"Discussion on CSS and USS in NR system", R1-1611837, 3GPP TSG RAN WG1 Meeting #87, Reno, USA, Nov. 14-18, 2016, all pages.

* cited by examiner

METHOD AND DEVICE FOR TRANSMITTING DOWNLINK CHANNEL

CROSS-REFERENCE TO RELATED APPLICATIONS

The present application is the U.S. national phase of PCT Application No. PCT/CN2018/081888 filed on Apr. 4, 2018, which claims a priority to the Chinese patent application No. 201710299306.5 filed on Apr. 28, 2017, the disclosures of which are incorporated in their entireties by reference herein.

TECHNICAL FIELD

The present disclosure relates to the field of communication technology, and in particular, to a method and a device for transmitting a downlink channel.

BACKGROUND

The mobile Internet is subverting the traditional mobile communication service model, providing users with an unprecedented experience, and having a profound impact on various aspects of people's work and life. The mobile Internet will promote a further upgrade of human social information interaction modes, providing users with a richer service experience such as augmented reality, virtual reality, ultrahigh-definition (3D) video, mobile cloud and so on. The further development of the mobile Internet will bring about a thousand times increase in mobile traffic in the future, and promote a new round of changes in mobile communication technologies and industries. The Internet of Things (IoT) has expanded the range of services for mobile communications, extending from human-to-human communication to the intelligent interconnection of people and things as well as things and things, enabling the mobile communication technology to penetrate into a wider range of industries and fields. In the future, mobile medical, car networking, smart home, industrial control, environmental monitoring and the like will promote the explosive growth of IoT applications, and hundreds of billions of devices will have access to the network to achieve a true "Internet of Everything". At the same time, massive device connections and diverse IoT services will also bring new technical challenges to mobile communication.

As new service requirements continue to emerge and become more diverse, higher performance demands are raised on future mobile communication systems, such as higher peak rates, better user experience rates, smaller latency, higher reliability, higher spectral efficiency, higher energy efficiency, etc. Moreover, accesses of more users are required to be supported, and various types of services will be used. In order to support a large number of various terminal connections and different types of services, a flexible configuration of uplink and downlink resources has become a major trend in technology development. The future system resources may be divided into different sub-bands according to different services, and transmission time intervals (TTIs) of different lengths are formed on the sub-bands to meet requirements of various services.

In the Long-Term Evolution (LTE) Frequency Division Duplexing (FDD) system in the related art, different carrier frequencies are used for uplink and downlink transmissions, and the same frame structure is used for both the uplink and downlink transmissions. On each carrier, a radio frame with a length of 10 ms contains ten 1 ms subframes, and each subframe is internally divided into two time slots each with a length of 0.5 ms. The TTI duration of uplink and downlink data transmission is 1 ms. In the LTE Time Division Duplexing (TDD) system in the related art, different subframes or different time slots on the same frequency are used for uplink and downlink transmissions. In the frame structure used by the TDD system, each 10 ms radio frame consists of two 5 ms half frames, and each half frame includes five subframes with a length of 1 ms. The subframes are classified into three types: downlink subframes, uplink subframes, and special subframes. Each of the special subframes consists of the following three portions: a Downlink Pilot Time Slot (DwPTS), a Guard Period (GP), and an Uplink Pilot Time Slot (UpPTS). The DwPTS may transmit a downlink pilot, downlink service data, and a downlink control signaling, the GP does not transmit any signal, and the UpPTS only transmits a random access and sounding reference symbols (SRS), and cannot transmit an uplink service or uplink control information. Each half frame includes at least one downlink subframe and at least one uplink subframe, and at most one special subframe.

In the LTE system in the related art, a physical downlink control channel (PDCCH) is configured to carry scheduling information and other control information. There may be a plurality of PDCCHs in a control region of each downlink subframe, and the size of the control region is determined by a Physical Control Format Indicator Channel (PCFICH), and occupies 1 to 4 Orthogonal Frequency Division Multiplexing (OFDM) symbols. The transmission of one control channel occupies one control channel element (CCE) or a plurality of consecutive CCEs, each CCE consists of 9 resource element groups (REGs), and the REG included in the CCE of the PDCCH is a REG that is not used to carry PCFICH and PHICH. A user equipment (UE) monitors a set of candidate PDCCHs in a non-DRX subframe, that is, it attempts to decode each PDCCH in a search space according to the downlink control information (DCI) format to be monitored. In order to expand the capacity of the PDCCH, an Enhanced Physical Downlink Control Channel (EPDCCH) is introduced in Rel-11. The EPDCCH is transmitted in a data region in a subframe, and does not occupy the transmission space of the PDCCH. A UE configured with an EPDCCH detects and receives EPDCCH in a Physical Resource Block (PRB) set configured in each subframe. For an EMTC UE, it detects and receives MPDCCH on one or more subframes configured in a higher layer.

In the LTE system in the related art, the UE may blindly detect its own PDCCH on a CSS or USS according to acquired information. For example, the UE may, in the USS, detect and receive a PDCCH which schedules unicast data, and in the CSS detect and receive a PDCCH which schedules broadcast data. In a future mobile communication system, it may be necessary to introduce a group common PDCCH which schedules or notifies a group of UE-related information, but as to a location of resource for transmission of the group common PDCCH and how the UE receives the group common PDCCH, there is currently no definite solution.

SUMMARY

An object of the present disclosure is to provide a method and a device for transmitting a downlink channel, so as to solve the problem that the existing solutions does not ascertain how to transmit a group common physical downlink control channel (PDCCH).

In one aspect, the disclosure provides a method for transmitting a downlink channel, which includes:

notifying a User Equipment (UE) of a resource set for transmission of a group common physical downlink control channel (PDCCH).

Optionally, notifying the UE of the resource set for transmission of the group common PDCCH specifically includes:

notifying the UE of the resource set for transmission of the group common PDCCH by high layer signaling; or in a case that the resource set of the group common PDCCH overlaps with a resource set of a common downlink control channel, notifying the UE of the resource set for transmission of the common downlink control channel by a main information block (MIB) message, thereby implicitly notifying the UE of the resource set for transmission of the group common PDCCH.

Optionally, the resource set of the group common PDCCH overlaps with a resource set of another control channel, or is separate from a resource set of another control channel.

Optionally, the resource set of the group common PDCCH overlaps with a resource set of another control channel, and a channel structure of the group common PDCCH is the same as a channel structure of another PDCCH; and the method further includes:

transmitting the group common PDCCH according to a predetermined downlink control information (DCI) format of the group common PDCCH in the resource set of the group common PDCCH.

Optionally, the resource set of the group common PDCCH overlapping with the resource set of another control channel specifically includes:

the resource set of the group common PDCCH overlaps with a resource set for transmission of a common downlink control channel configured by a main information block (MIB) or a system information block (SIB).

Optionally, transmitting the group common PDCCH according to the predetermined downlink control information (DCI) format of the group common PDCCH in the resource set of the group common PDCCH specifically includes:

transmitting the group common PDCCH according to the predetermined DCI format of the group common PDCCH in a resource set of the group common PDCCH on a first Orthogonal Frequency Division Multiplexing (OFDM) symbol of a time slot in which the group common PDCCH is transmitted.

Optionally, the resource set of the group common PDCCH is separate from a resource set of another control channel, and a channel structure of the group common PDCCH is the same as a channel structure of another PDCCH; and the method further includes:

transmitting the group common PDCCH according to a predetermined downlink control information (DCI) format of the group common PDCCH in the resource set of the group common PDCCH.

Optionally, the resource set of the group common PDCCH is separate from a resource set of another control channel, and a channel structure of the group common PDCCH is different from that of another PDCCH; and the method further includes:

transmitting the group common PDCCH according to a predetermined channel structure of the group common PDCCH in the resource set of the group common PDCCH.

Optionally, the method further includes:

notifying the UE of a radio network temporary identifier (RNTI) value used for scrambling cyclic redundancy check (CRC) of the group common PDCCH by high layer signaling; and the transmitting the group common PDCCH according to the predetermined DCI format of the group common PDCCH in the resource set of the group common PDCCH specifically includes:

transmitting the group common PDCCH according to a predetermined DCI format added with the CRC scrambled by the RNTI value, in the resource set of the group common PDCCH.

Optionally, the group common PDCCH carries the information of a group of User Equipment (UEs), and the group of UEs includes at least one UE.

In another aspect, the present disclosure further provides a method for transmitting a downlink channel, which includes:

acquiring a resource set of a base station for transmission of a group common physical downlink control channel (PDCCH).

Optionally, the acquiring the resource set of the base station for transmission of the group common PDCCH specifically includes:

acquiring the resource set of the base station for transmission of the group common PDCCH by high layer signaling; or in a case that the resource set of the group common PDCCH overlaps with a resource set of a common downlink control channel, acquiring the resource set of the base station for transmission of the common downlink control channel through a main information block (MIB) message, and determining the resource set of the base station for transmission of the group common PDCCH.

Optionally, the resource set of the group common PDCCH overlaps with a resource set of another control channel, or is separate from a resource set of another control channel.

Optionally, the resource set of the group common PDCCH overlaps with a resource set of another control channel, and a channel structure of the group common PDCCH is the same as a channel structure of another PDCCH; and the method further includes:

detecting and receiving the group common PDCCH according to a predetermined downlink control information (DCI) format of the group common PDCCH in the resource set of the group common PDCCH.

Optionally, the resource set of the group common PDCCH overlapping with the resource set of another control channel specifically includes:

the resource set of the group common PDCCH overlaps with a resource set for transmission of a common downlink control channel configured by a main information block (MIB) or a system information block (SIB).

Optionally, the detecting and receiving the group common PDCCH according to the predetermined DCI format of the group common PDCCH in the resource set of the group common PDCCH specifically includes:

detecting and receiving the group common PDCCH according to the predetermined DCI format of the group common PDCCH in a resource set of the group common PDCCH on a first Orthogonal Frequency Division Multiplexing (OFDM) symbol of a time slot in which the group common PDCCH is transmitted.

Optionally, the resource set of the group common PDCCH is separate from a resource set of another control channel, and a channel structure of the group common PDCCH is the same as a channel structure of another PDCCH; and the method further includes:

detecting and receiving the group common PDCCH according to a predetermined downlink control information (DCI) format of the group common PDCCH in the resource set of the group common PDCCH.

Optionally, the resource set of the group common PDCCH is separate from a resource set of another control channel, and a channel structure of the group common PDCCH is different from that of another PDCCH; and the method further includes:

detecting and receiving the group common PDCCH according to a predetermined channel structure of the group common PDCCH in the resource set of the group common PDCCH.

Optionally, the method further includes:

acquiring a radio network temporary identifier (RNTI) value used for scrambling the cyclic redundancy check (CRC) of the group common PDCCH by high layer signaling; and the detecting and receiving the group common PDCCH according to the predetermined DCI format of the group common PDCCH in the resource set of the group common PDCCH specifically includes:

detecting and receiving a predetermined DCI format of the group common PDCCH according to the RNTI value, in the resource set of the group common PDCCH, wherein the predetermined DCI format is added with a CRC scrambled by the RNTI value.

Optionally, the group common PDCCH carries the information of a group of User Equipment (UEs), and the group of UEs includes at least one UE.

In further another aspect, the disclosure provides a device for transmitting a downlink channel, which includes:

a first notifying module, configured to notify a User Equipment (UE) of a resource set for transmission of a group common physical downlink control channel (PDCCH).

Optionally, the first notifying module is specifically configured to:

notify the UE of the resource set for transmission of the group common PDCCH by high layer signaling; or in a case that the resource set of the group common PDCCH overlaps with a resource set of a common downlink control channel, notify the UE of the resource set for transmission of the common downlink control channel by a main information block (MIB) message, thereby implicitly notifying the UE of the resource set for transmission of the group common PDCCH.

Optionally, the resource set of the group common PDCCH overlaps with a resource set of another control channel, or is separate from a resource set of another control channel.

Optionally, the resource set of the group common PDCCH overlaps with a resource set of another control channel, and a channel structure of the group common PDCCH is the same as a channel structure of another PDCCH; and the device further includes:

a first transmitting module, configured to transmit the group common PDCCH according to a predetermined downlink control information (DCI) format of the group common PDCCH in the resource set of the group common PDCCH.

Optionally, the resource set of the group common PDCCH overlapping with the resource set of another control channel specifically includes:

the resource set of the group common PDCCH overlaps with a resource set for transmission of a common downlink control channel configured by a main information block (MIB) or a system information block (SIB).

Optionally, the first transmitting module is specifically configured to:

transmit the group common PDCCH according to the predetermined DCI format of the group common PDCCH in a resource set of the group common PDCCH on a first Orthogonal Frequency Division Multiplexing (OFDM) symbol of a time slot in which the group common PDCCH is transmitted.

Optionally, the resource set of the group common PDCCH is separate from a resource set of another control channel, and a channel structure of the group common PDCCH is the same as a channel structure of another PDCCH; and the device further includes:

a second transmitting module, configured to transmit the group common PDCCH according to a predetermined downlink control information (DCI) format of the group common PDCCH in the resource set of the group common PDCCH.

Optionally, the resource set of the group common PDCCH is separate from a resource set of another control channel, and a channel structure of the group common PDCCH is different from that of another PDCCH; and the device further includes:

a third transmitting module, configured to transmit the group common PDCCH according to a predetermined channel structure of the group common PDCCH in the resource set of the group common PDCCH.

Optionally, the device further includes:

a second notifying module, configured to notify the UE of a radio network temporary identifier (RNTI) value used for scrambling the cyclic redundancy check (CRC) of the group common PDCCH by high layer signaling; and the second transmitting module is specifically configured to:

transmit the group common PDCCH according to a predetermined DCI format added with the CRC scrambled by the RNTI value, in the resource set of the group common PDCCH.

Optionally, the group common PDCCH carries the information of a group of UEs, and the group of UEs includes at least one UE.

In still further another aspect, the disclosure provides a device for transmitting a downlink channel, which includes:

a first acquiring module, configured to acquire a resource set of a base station for transmission of a group common physical downlink control channel (PDCCH).

Optionally, the first acquiring module is specifically configured to:

acquire the resource set of the base station for transmission of the group common PDCCH by high layer signaling; or in a case that the resource set of the group common PDCCH overlaps with a resource set of a common downlink control channel, acquire the resource set of the base station for transmission of the common downlink control channel through a main information block (MIB) message, and determine the resource set of the base station for transmission of the group common PDCCH.

Optionally, the resource set of the group common PDCCH overlaps with a resource set of another control channel, or is separate from a resource set of another control channel.

Optionally, the resource set of the group common PDCCH overlaps with a resource set of another control channel, and a channel structure of the group common PDCCH is the same as a channel structure of another PDCCH; and the device further includes:

a first receiving module, configured to detect and receive the group common PDCCH according to a predetermined downlink control information (DCI) format of the group common PDCCH in the resource set of the group common PDCCH.

Optionally, that the resource set of the group common PDCCH overlapping with the resource set of another control channel specifically includes:

the resource set of the group common PDCCH overlaps with a resource set for transmission of a common downlink control channel configured by a main information block (MIB) or a system information block (SIB).

Optionally, the first receiving module is specifically configured to:

detect and receive the group common PDCCH according to the predetermined DCI format of the group common PDCCH in a resource set of the group common PDCCH on a first Orthogonal Frequency Division Multiplexing (OFDM) symbol of a time slot in which the group common PDCCH is transmitted.

Optionally, the resource set of the group common PDCCH is separate from a resource set of another control channel, and a channel structure of the group common PDCCH is the same as a channel structure of another PDCCH; and the device further includes:

a second receiving module, configured to detect and receive the group common PDCCH according to a predetermined downlink control information (DCI) format of the group common PDCCH in the resource set of the group common PDCCH.

Optionally, the resource set of the group common PDCCH is separate from a resource set of another control channel, and a channel structure of the group common PDCCH is different from that of another PDCCH; and the device further includes:

a third receiving module, configured to detect and receive the group common PDCCH according to a predetermined channel structure of the group common PDCCH in the resource set of the group common PDCCH.

Optionally, the device further includes:

a second acquiring module, configured to acquire a radio network temporary identifier (RNTI) value used for scrambling cyclic redundancy check (CRC) of the group common PDCCH by high layer signaling; and the second receiving module is specifically configured to:

detect and receive a predetermined DCI format of the group common PDCCH according to the RNTI value, in the resource set of the group common PDCCH, wherein the predetermined DCI format is added with a CRC scrambled by the RNTI value.

Optionally, the group common PDCCH carries the information of a group of UEs, and the group of UEs includes at least one UE.

In further another aspect, the present disclosure provides a device for transmitting a downlink channel, which includes: a processor, a storage, and a computer program which is stored on the storage and capable of running on the processor, wherein when the computer program is executed by the processor, steps in the method for transmitting the downlink channel as described above are implemented.

In further another aspect, the present disclosure provides a computer readable storage medium having a computer program stored thereon, wherein when the computer program is executed by a processor, steps in the method for transmitting the downlink channel as described above are implemented.

In the method for transmitting a downlink channel according to the embodiment of the present disclosure, by notifying the UE of a resource set for transmission of a group common PDCCH, the UE can ascertain a resource location for detection and reception of the group common PDCCH, thereby detecting and receiving the group common PDCCH at the resource location of the group common PDCCH.

BRIEF DESCRIPTION OF THE DRAWINGS

In order to illustrate the technical solutions of embodiments of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

The technical solutions in the embodiments of the present disclosure are clearly and completely described hereinafter with reference to the accompanying drawings in the embodiments of the present disclosure. It is obvious that the described embodiments are only some of the embodiments of the present disclosure, not all of the embodiments. All other embodiments obtained by a person skilled in the art based on the embodiments of the present disclosure without creative efforts will fall within the scope of the present disclosure.

Figure 1:
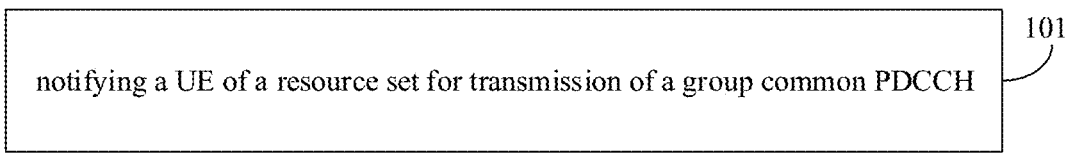
FIG. 1 shows a flow chart of a method for transmitting a downlink channel according to an embodiment of the present disclosure.

As shown in FIG. 1, an embodiment of the present disclosure provides a method for transmitting a downlink channel, which is applied to a base station and includes step 101, which is described in detail below:

Step 101: notifying a User Equipment (UE) of a resource set for transmission of a group common physical downlink control channel (PDCCH);

where the group common PDCCH carries the information of a group of UEs, and the group of UEs includes at least one UE.

In the embodiment of the present disclosure, the resource set of the group common PDCCH may overlap with a resource set of another control channel, or may be separate from a resource set of another control channel (that is, not overlap with a resource set of transmission resources of another control channel). Namely, the group common PDCCH may occupy a same resource set as another PDCCH for transmission, or may occupy a resource set separate from transmission resources of another control channel for transmission. That the resource set of the group common PDCCH overlaps with the resource set of another control channel may specifically be: the resource set of the group common PDCCH overlaps with a resource set for transmission of a common downlink control channel configured by a main information block (MIB) or a system information block (SIB), and/or the resource set of the group common PDCCH overlaps with a resource set of a UE dedicated PDCCH, etc.

In the method for transmitting a downlink channel according to the embodiment of the present disclosure, by notifying the UE of a resource set for transmission of a group common PDCCH, the UE can ascertain a resource location for detection and reception of the group common PDCCH, thereby detecting and receiving the group common PDCCH at the resource location of the group common PDCCH.

In the embodiment of the present disclosure, the process that the base station notifies the UE of the resource set for transmission of the group common PDCCH may specifically be:

notifying the UE of the resource set for transmission of the group common PDCCH by high layer signaling; or in a case that the resource set of the group common PDCCH overlaps with a resource set of a common downlink control channel, notifying, by a main information block (MIB) message, the UE of the resource set for transmission of the common downlink control channel, thereby implicitly notifying the UE of the resource set for transmission of the group common PDCCH.

Specifically, the high layer signaling is high layer signaling of each UE, for example, Radio Resource Control (RRC) signaling. When the resource set of the group common PDCCH is separate from the resource set of another control channel, the high layer signaling may directly notify the UE of the resource set for transmission of the group common PDCCH, that is, the resource set of the group common PDCCH is configured by the high layer signaling. When the resource set of the common PDCCH overlaps with the resource set for transmission of the common downlink control channel according to a protocol agreement or a predetermined rule, the MIB may configure the resource set of the common downlink control channel, and notify the UE of the resource set for transmission of the common downlink control channel by the MIB message. At this point, the UE may determine the resource set of the group common PDCCH according to the resource set for transmission of the common downlink control channel configured in the MIB, and detect and receive the group common PDCCH.

In the embodiment of the present disclosure, when the resource set of the group common PDCCH overlaps with a resource set of another control channel, a channel structure of the group common PDCCH is the same as a channel structure of another PDCCH. Further, the base station may transmit the group common PDCCH according to a predetermined downlink control information (DCI) format of the group common PDCCAH in the resource set of the group common PDCCH. The predetermined DCI format of the group common PDCCH may for example be DCI format X.

That is, when the resource set of the group common PDCCH overlaps with a resource set of another control channel, a channel structure of the group common PDCCH is the same as a channel structure of another PDCCH, and the transmission method of one embodiment of the present disclosure further includes:

transmitting the group common PDCCH according to a predetermined DCI format of the group common PDCCH in the resource set of the group common PDCCH.

As such, when the UE is required to receive the group common PDCCH, it may blindly detect the group common PDCCH according to the predetermined DCI format of the group common PDCCH in the resource set of the group common PDCCH.

In addition, in order to facilitate the UE in quickly detecting and receiving the group common PDCCH, the group common PDCCH may be transmitted on a first Orthogonal Frequency Division Multiplexing (OFDM) symbol of a time slot. Therefore, the process of the base station transmitting the group common PDCCH according to the predetermined DCI format of the group common PDCCH in the resource set of the group common PDCCH may specifically be:

transmitting the group common PDCCH according to the predetermined DCI format of the group common PDCCH in a resource set of the group common PDCCH on a first Orthogonal Frequency Division Multiplexing (OFDM) symbol of a time slot in which the group common PDCCH is transmitted.

In the embodiment of the present disclosure, when the resource set of the group common PDCCH is separate from a resource set of another control channel, a channel structure of the group common PDCCH may be the same as a channel structure of another PDCCH, or may not be the same as a channel structure of another PDCCH. When the channel structure of the group common PDCCH is the same as the channel structure of another PDCCH, the base station may transmit the group common PDCCH according to the predetermined DCI format of the group common PDCCH in the resource set of the group common PDCCH. When the channel structure of the group common PDCCH is different from that of another PDCCH, the base station may transmit the group common PDCCH according to a predetermined channel structure of the group common PDCCH in the resource set of the group common PDCCH.

That is, when the resource set of the group common PDCCH is separate from the resource set of another control channel, and the channel structure of the group common PDCCH is the same as the channel structure of another PDCCH, the transmission method of the embodiment of the present disclosure may further include:

transmitting the group common PDCCH according to a predetermined downlink control information (DCI) format of the group common PDCCH in the resource set of the group common PDCCH.

Alternatively, when the resource set of the group common PDCCH is separate from the resource set of another control channel, and the channel structure of the group common PDCCH is different from that of another PDCCH, the transmission method of the embodiment of the present disclosure may further include:

transmitting the group common PDCCH according to a predetermined channel structure of the group common PDCCH in the resource set of the group common PDCCH.

It is noted that in a case that the resource set of the group common PDCCH is separate from the resource set of another control channel, when the base station transmits the group common PDCCH, the group common PDCCH may be transmitted in a resource set of the group common PDCCH on a first OFDM symbol of a time slot in which the group common PDCCH is transmitted.

In the embodiment of the present disclosure, in order to enhance the security of the transmission of the group common PDCCH, the base station may perform cyclic redundancy check (CRC) scrambling on the predetermined DCI format of the group common PDCCH by using a specific value, for example, a radio network temporary identifier (RNTI) value configured through RRC signaling. Then the base station may transmit the group common PDCCH according to the predetermined DCI format added with the CRC scrambled by the RNTI value, in the resource set of the group common PDCCH. In order for the relevant UE to detect and receive the predetermined DCI format scrambled by the CRC, the base station may notify the UE of the RNTI value used for scrambling the CRC by high layer signaling.

Therefore, the transmission method of the embodiment of the present disclosure may further include:

notifying the UE of a RNTI value used for scrambling the CRC of the group common PDCCH by high layer signaling.

Correspondingly, the base station may transmit the group common PDCCH according to the predetermined DCI format added with the CRC scrambled by the RNTI value, in the resource set of the group common PDCCH.

Hereinafter, the method for transmitting a downlink channel of the present disclosure will be described by way of specific Examples 1 to 3.

Example 1

Figures 2A, 2B:
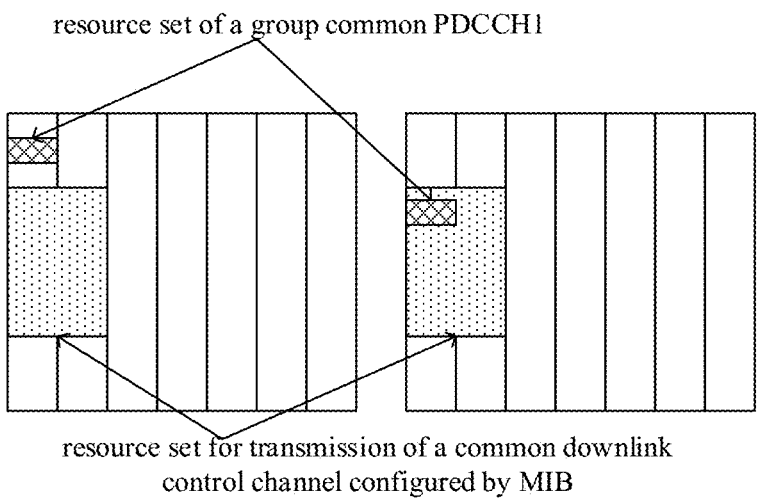
FIGS. 2(a) and 2(b) are schematic views showing transmission locations of a group common PDCCH1 of a first specific example of the present disclosure.

It is assumed that the base station configures, by high layer signaling, that the UEs need to detect and receive a group common PDCCH; for example, UE1, UE2 and UE3 need to detect and receive a group common PDCCH1. The group common PDCCH1 is transmitted on the first OFDM symbol of the time slot in which the group common PDCCH needs to be transmitted. The higher layer signalings corresponding to UE1, UE2 and UE3, e.g., RRC signaling 1, RRC signaling 2, and RRC signaling 3, respectively notify the UE1, UE2 and UE3 of the corresponding resource set occupied by the transmission of the group common PDCCH1. The resource set for transmission of the group common PDCCH1 may overlap with the resource set of another control channel. For example, as shown in FIG. 2(b), the resource set for transmission of the group common PDCCH1 overlaps with the resource set for transmission of a common downlink control channel configured by the MIB. The resource set for transmission of the group common PDCCH1 may also be separate from the resource set of another control channel; for example, as shown in FIG. 2(a), the resource set for transmission of the group common PDCCH1 is separate from the resource set for transmission of a common downlink control channel configured by the MIB.

When the resource set for transmission of the group common PDCCH1 configured by RRC signaling overlaps with the resource set for transmission of a common downlink control channel configured by the MIB, the information carried by the group common PDCCH1 is transmitted by the DCI format X related to the group common PDCCH1, and the UE detects and receives the group common PDCCH1 in the resource set of the group common PDCCH1 according to the DCI format X.

When the resource set for transmission of the group common PDCCH1 configured by RRC signaling is separate from the resource set for transmission of a common downlink control channel configured by the MIB, the information carried by the group common PDCCH1 is transmitted by the DCI format X related to the group common PDCCH1, and the UE detects and receives the group common PDCCH1 in the resource set of the group common PDCCH1 according to the DCI format X. Alternatively, the group common PDCCH1 has a channel structure different from that of other PDCCHs, and the UE detects and receives the corresponding group common PDCCH1 in the resource set of the group common PDCCH1 according to a predetermined channel structure of the group common PDCCH1.

Example 2

Figures 3A, 3B:
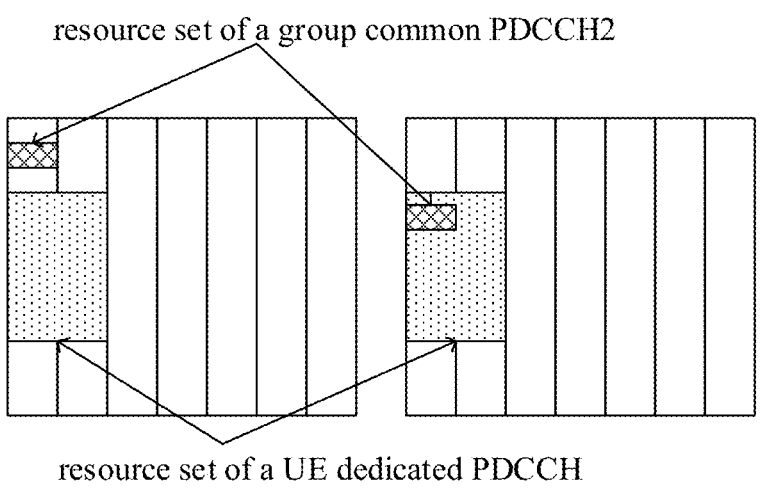
FIGS. 3(a) and 3(b) are schematic views showing transmission locations of a group common PDCCH1 of a second specific example of the present disclosure.

It is assumed that the base station configures, by high layer signaling, that the UEs need to detect and receive a group common PDCCH; for example, UE4, UE5 and UE6 need to detect and receive a group common PDCCH2. The group common PDCCH2 is transmitted on the first OFDM symbol of the time slot in which the group common PDCCH needs to be transmitted. The higher layer signalings corresponding to UE4, UE5 and UE6, e.g., RRC signaling 4, RRC signaling 5, and RRC signaling 6, respectively notify the UE4, UE5 and UE6 of the corresponding resource set occupied by the transmission of the group common PDCCH2. The resource set for transmission of the group common PDCCH2 may overlap with the resource set of another control channel. For example, as shown in FIG. 3(b), the resource set for transmission of the group common PDCCH2 overlaps with a resource set of a UE dedicated PDCCH. The resource set for transmission of the group common PDCCH2 may also be separate from the resource set of another control channel; for example, as shown in FIG. 3(a), the resource set for transmission of the group common PDCCH2 is separate from a resource set of a UE dedicated PDCCH.

When the resource set for transmission of the group common PDCCH2 configured by RRC signaling overlaps with the resource set of the UE dedicated PDCCH, the information carried by the group common PDCCH2 is transmitted by the DCI format X related to the group common PDCCH2, and the UE detects and receives the group common PDCCH2 in the resource set of the group common PDCCH2 according to the DCI format X.

When the resource set for transmission of the group common PDCCH2 configured by RRC signaling is separate from the resource set of the UE dedicated PDCCH, the information carried by the group common PDCCH2 is transmitted by the DCI format X related to the group common PDCCH2, and the UE detects and receives the group common PDCCH2 in the resource set of the group common PDCCH2 according to the DCI format X. Alternatively, the group common PDCCH2 has a channel structure different from that of other PDCCHs, and the UE detects and receives the corresponding group common PDCCH2 in the resource set of the group common PDCCH2 according to a predetermined channel structure of the group common PDCCH2.

Example 3

It is assumed that the base station configures, by high layer signaling, that the UEs need to detect and receive a group common PDCCH; for example, UE1, UE2 and UE3 need to detect and receive a group common PDCCH1. The DCI format X related to the group common PDCCH1 is introduced. The group common PDCCH1 is transmitted within a resource set for transmission of a common downlink control channel notified by the MIB or the SIB. When the group PDCCH1 is transmitted, the same channel structure as other control channels is used, but the DCI format X of the group common PDCCH1 is CRC-scrambled by the RNTI value, so the high layer signalings RRC signaling 1, RRC signaling 2 and RRC signaling 3 corresponding to UE1, UE2, and UE3 notify UE1, UE2, and UE3 of the RNTI value used for scrambling CRC of the corresponding group common PDCCH1. When the UE detects and receives the group common PDCCH1 in the resource set of the group common PDCCH1, it detects and receives the DCI format X according to the RNTI value.

In the above embodiment, a method for transmitting a downlink channel on a base station side of the present disclosure is described, and a method for transmitting a downlink channel on a UE side of the present disclosure will be described below with reference to the embodiments and the accompanying drawings.

Figure 4:
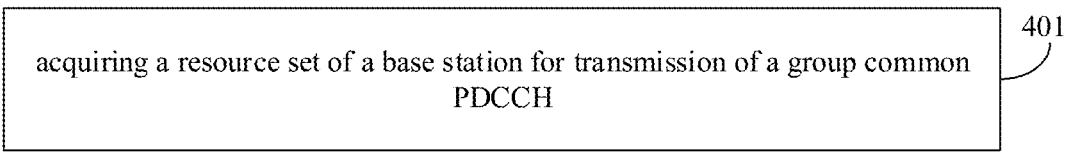
FIG. 4 shows a flow chart of another method for transmitting a downlink channel according to an embodiment of the present disclosure.

As shown in FIG. 4, an embodiment of the present disclosure further provides a method for transmitting a downlink channel, which is applied to a UE and includes step 401, which is described in detail below:

Step 401: acquiring a resource set of a base station for transmission of a group common physical downlink control channel (PDCCH);

where the group common PDCCH carries the information of a group of UEs, and the group of UEs includes at least one UE.

In the embodiment of the present disclosure, the resource set of the group common PDCCH may overlap with a resource set of another control channel, or may be separate from a resource set of another control channel. Namely, the group common PDCCH may occupy a same resource set as another PDCCH for transmission, or may occupy a resource set separate from transmission resources of another control channel for transmission. That the resource set of the group common PDCCH overlaps with the resource set of another control channel may specifically be: the resource set of the group common PDCCH overlaps with a resource set for transmission of a common downlink control channel configured by a main information block (MIB) or a system information block (SIB), and/or, the resource set of the group common PDCCH overlaps with a resource set of a UE dedicated PDCCH, etc.

In the method for transmitting a downlink channel according to the embodiment of the present disclosure, by acquiring a resource set of a base station for transmission of a group common PDCCH, the UE can ascertain a resource location for detection and reception of the group common PDCCH, thereby detecting and receiving the group common PDCCH at the resource location of the group common PDCCH.

In the embodiment of the present disclosure, the acquiring by the UE the resource set of the base station for transmission of the group common PDCCH may specifically be:

acquiring the resource set of the base station for transmission of the group common PDCCH by high layer signaling; or in a case that the resource set of the group common PDCCH overlaps with a resource set of a common downlink control channel, acquiring the resource set of the base station for transmission of the common downlink control channel through a main information block (MIB) message, and determining the resource set of the base station for transmission of the group common PDCCH.

When the resource set of the group common PDCCH overlaps with a resource set of another control channel, and a channel structure of the group common PDCCH is the same as a channel structure of another PDCCH, then the transmission method of the embodiment of the present disclosure may further include:

detecting and receiving the group common PDCCH according to a predetermined DCI format of the group common PDCCH in the resource set of the group common PDCCH.

Specifically, the process of the UE detecting and receiving the group common PDCCH according to a predetermined DCI format of the group common PDCCH in the resource set of the group common PDCCH may be:

detecting and receiving the group common PDCCH according to the predetermined DCI format of the group common PDCCH in a resource set of the group common PDCCH on a first OFDM symbol of a time slot in which the group common PDCCH is transmitted.

When the resource set of the group common PDCCH is separate from a resource set of another control channel, and a channel structure of the group common PDCCH is the same as a channel structure of another PDCCH, then the transmission method of the embodiment of the present disclosure may further include:

detecting and receiving the group common PDCCH according to a predetermined DCI format of the group common PDCCH in the resource set of the group common PDCCH.

When the resource set of the group common PDCCH is separate from a resource set of another control channel, and a channel structure of the group common PDCCH is different from that of another PDCCH, then the transmission method of the embodiment of the present disclosure may further include:

detecting and receiving the group common PDCCH according to a predetermined channel structure of the group common PDCCH in the resource set of the group common PDCCH.

In the embodiment of the present disclosure, the transmission method may further include:

acquiring a RNTI value used for scrambling CRC of the group common PDCCH by high layer signaling; and detecting and receiving, by the UE, a predetermined DCI format of the group common PDCCH according to the RNTI value, in the resource set of the group common PDCCH, where the predetermined DCI format is added with a CRC scrambled by the RNTI value.

In the above embodiment, a method for transmitting a downlink channel of the present disclosure is described, and a device for transmitting a downlink channel of the present disclosure will be described below with reference to the embodiments and the accompanying drawings.

Figure 5:
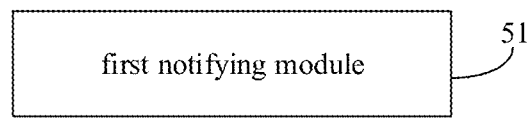
FIG. 5 shows a first schematic structural view of a device for transmitting a downlink channel according to an embodiment of the present disclosure.

As shown in FIG. 5, an embodiment of the present disclosure further provides a device for transmitting a downlink channel, which is applied to a base station and includes:

a first notifying module 151, configured to notify a UE of a resource set for transmission of a group common PDCCH.

In the device for transmitting a downlink channel according to the embodiment of the present disclosure, by notifying the UE of a resource set for transmission of a group common PDCCH, the UE can ascertain a resource location for detection and reception of the group common PDCCH, thereby detecting and receiving the group common PDCCH at the resource location of the group common PDCCH.

In the embodiment of the present disclosure, the first notifying module 151 is specifically configured to:

notify the UE of the resource set for transmission of the group common PDCCH by high layer signaling; or in a case that the resource set of the group common PDCCH overlaps with a resource set of a common downlink control channel, notify, by a MIB message, the UE of the resource set for transmission of the common downlink control channel, thereby implicitly notifying the UE of the resource set for transmission of the group common PDCCH.

In the embodiment of the present disclosure, the resource set of the group common PDCCH overlaps with a resource set of another control channel, or is separate from a resource set of another control channel.

Figure 6:
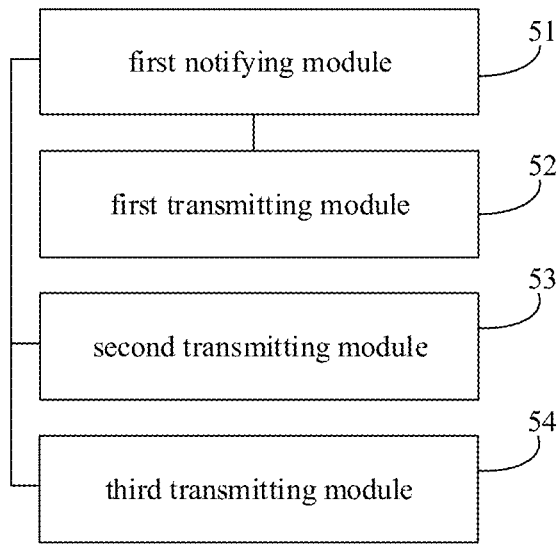
FIG. 6 shows a second schematic structural view of a device for transmitting a downlink channel according to an embodiment of the present disclosure.

In the embodiment of the present disclosure, the resource set of the group common PDCCH overlaps with a resource set of another control channel, a channel structure of the group common PDCCH is the same as a channel structure of another PDCCH, and as shown in FIG. 6, the transmission device further includes:

a first transmitting module 52, configured to transmit the group common PDCCH according to a predetermined DCI format of the group common PDCCH in the resource set of the group common PDCCH.

That the resource set of the group common PDCCH overlaps with the resource set of another control channel may specifically be: the resource set of the group common PDCCH overlaps with a resource set for transmission of a common downlink control channel configured by a MIB or a SIB.

The first transmitting module 52 is specifically configured to:

transmit the group common PDCCH according to the predetermined DCI format of the group common PDCCH in a resource set of the group common PDCCH on a first OFDM symbol of a time slot in which the group common PDCCH is transmitted.

In the embodiment of the present disclosure, the resource set of the group common PDCCH is separate from a resource set of another control channel, a channel structure of the group common PDCCH is the same as a channel structure of another PDCCH, and as shown in FIG. 6, the transmission device further includes:

a second transmitting module 53, configured to transmit the group common PDCCH according to a predetermined DCI format of the group common PDCCH in the resource set of the group common PDCCH.

The second transmitting module 53 may be specifically configured to transmit the group common PDCCH according to the predetermined DCI format of the group common PDCCH in a resource set of the group common PDCCH on a first OFDM symbol of a time slot in which the group common PDCCH is transmitted.

In the embodiment of the present disclosure, the resource set of the group common PDCCH is separate from a resource set of another control channel, a channel structure of the group common PDCCH is different from that of another PDCCH, and as shown in FIG. 6, the transmission device further includes:

a third transmitting module 54, configured to transmit the group common PDCCH according to a predetermined channel structure of the group common PDCCH in the resource set of the group common PDCCH.

The third transmitting module 54 may be specifically configured to transmit the group common PDCCH according to a predetermined channel structure of the group common PDCCH in a resource set of the group common PDCCH on a first OFDM symbol of a time slot in which the group common PDCCH is transmitted.

In the embodiment of the present disclosure, the transmission device may further include:

a second notifying module, configured to notify the UE of a RNTI value used for scrambling the cyclic redundancy check CRC of the group common PDCCH by high layer signaling.

The second transmitting module 53 is specifically configured to:

transmit the group common PDCCH according to a predetermined DCI format added with the CRC scrambled by the RNTI value, in the resource set of the group common PDCCH.

The group common PDCCH carries the information of a group of UEs, and the group of UEs includes at least one UE.

Figure 7:
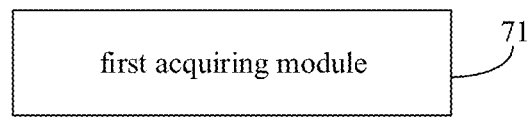
FIG. 7 shows a third schematic structural view of a device for transmitting a downlink channel according to an embodiment of the present disclosure.

As shown in FIG. 7, an embodiment of the present disclosure further provides a device for transmitting a downlink channel, which is applied to a UE and includes:

a first acquiring module 71, configured to acquire a resource set of a base station for transmission of a group common PDCCH.

In the device for transmitting a downlink channel according to the embodiment of the present disclosure, by acquiring a resource set of a base station for transmission of a group common PDCCH, the UE can ascertain a resource location for detection and reception of the group common PDCCH, thereby detecting and receiving the group common PDCCH at the resource location of the group common PDCCH.

In the embodiment of the present disclosure, the first acquiring module 71 is specifically configured to:

acquire the resource set of the base station for transmission of the group common PDCCH by high layer signaling; or in a case that the resource set of the group common PDCCH overlaps with a resource set of a common downlink control channel, acquire the resource set of the base station for transmission of the common downlink control channel through a MIB message, and determine the resource set of the base station for transmission of the group common PDCCH.

In the embodiment of the present disclosure, the resource set of the group common PDCCH overlaps with a resource set of another control channel, or is separate from a resource set of another control channel.

Figure 8:
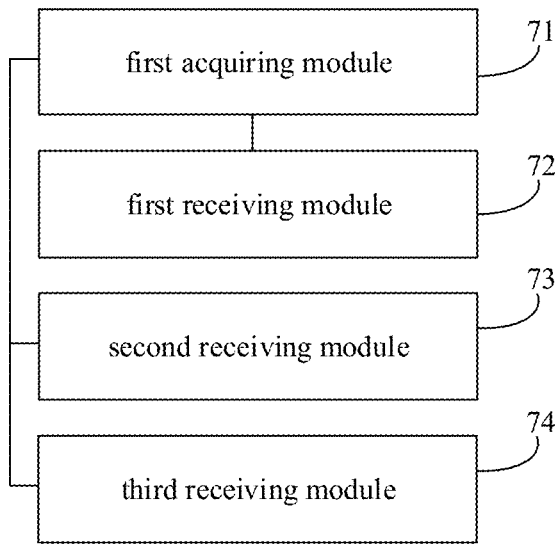
FIG. 8 shows a fourth schematic structural view of a device for transmitting a downlink channel according to an embodiment of the present disclosure.

In the embodiment of the present disclosure, the resource set of the group common PDCCH overlaps with a resource set of another control channel, a channel structure of the group common PDCCH is the same as a channel structure of another PDCCH, and as shown in FIG. 8, the transmission device further includes:

a first receiving module 72, configured to detect and receive the group common PDCCH according to a predetermined DCI format of the group common PDCCH in the resource set of the group common PDCCH.

That the resource set of the group common PDCCH overlaps with the resource set of another control channel may specifically be: the resource set of the group common PDCCH overlaps with a resource set for transmission of a common downlink control channel configured by a MIB or a SIB.

The first receiving module 72 is specifically configured to:

detect and receive the group common PDCCH according to the predetermined DCI format of the group common PDCCH in a resource set of the group common PDCCH on a first OFDM symbol of a time slot in which the group common PDCCH is transmitted.

In the embodiment of the present disclosure, the resource set of the group common PDCCH is separate from a resource set of another control channel, a channel structure of the group common PDCCH is the same as a channel structure of another PDCCH, and as shown in FIG. 8, the transmission device further includes:

a second receiving module 73, configured to detect and receive the group common PDCCH according to a predetermined DCI format of the group common PDCCH in the resource set of the group common PDCCH.

In the embodiment of the present disclosure, the resource set of the group common PDCCH is separate from a resource set of another control channel, a channel structure of the group common PDCCH is different from that of another PDCCH, and as shown in FIG. 8, the transmission device further includes:

a third receiving module 74, configured to detect and receive the group common PDCCH according to a predetermined channel structure of the group common PDCCH in the resource set of the group common PDCCH.

In the embodiment of the present disclosure, the transmission device further includes:

a second acquiring module, configured to acquire a RNTI value used for scrambling the CRC of the group common PDCCH by high layer signaling.

The second receiving module 73 is specifically configured to:

detect and receive a predetermined DCI format of the group common PDCCH according to the RNTI value, in the resource set of the group common PDCCH, where the predetermined DCI format is added with a CRC scrambled by the RNTI value.

The group common PDCCH carries the information of a group of UEs, and the group of UEs includes at least one UE.

Figure 9:
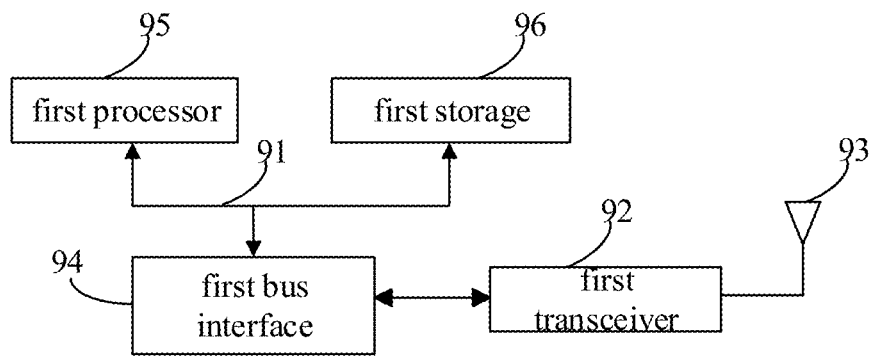
FIG. 9 shows a schematic structural view of a base station according to an embodiment of the present disclosure.

As shown in FIG. 9, an embodiment of the present disclosure further provides a base station, which includes a first bus 91, a first transceiver 92, an antenna 93, a first bus interface 94, a first processor 95 and a first storage 96.

The first processor 95 is configured to read a program in the first storage 96 and execute the following process:

controlling the first transceiver 92 to notify a UE of a resource set for transmission of a group common PDCCH.

The first transceiver 92 is configured to receive and transmit data under the control of the first processor 95.

Specifically, the first processor 95 is further configured to control the first transceiver 92 to notify the UE of the resource set for transmission of the group common PDCCH by high layer signaling; or in a case that the resource set of the group common PDCCH overlaps with a resource set of a common downlink control channel, notify the UE of the resource set for transmission of the common downlink control channel by a main information block (MIB) message, thereby implicitly notifying the UE of the resource set for transmission of the group common PDCCH.

Specifically, the resource set of the group common PDCCH overlaps with a resource set of another control channel, or is separate from a resource set of another control channel.

Specifically, the resource set of the group common PDCCH overlaps with a resource set of another control channel, a channel structure of the group common PDCCH is the same as a channel structure of another PDCCH, and the first processor 95 is further configured to: control the first transceiver 92 to transmit the group common PDCCH according to a predetermined DCI format of the group common PDCCH in the resource set of the group common PDCCH.

Specifically, that the resource set of the group common PDCCH overlaps with the resource set of another control channel specifically is: the resource set of the group common PDCCH overlaps with a resource set for transmission of a common downlink control channel configured by a MIB or a SIB.

Specifically, the first processor 95 is further configured to: control the first transceiver 92 to transmit the group common PDCCH according to the predetermined DCI format of the group common PDCCH in a resource set of the group common PDCCH on a first OFDM symbol of a time slot in which the group common PDCCH is transmitted.

Specifically, the resource set of the group common PDCCH is separate from a resource set of another control channel, a channel structure of the group common PDCCH is the same as a channel structure of another PDCCH, and the first processor 95 is further configured to: control the first transceiver 92 to transmit the group common PDCCH according to a predetermined DCI format of the group common PDCCH in the resource set of the group common PDCCH.

Specifically, the resource set of the group common PDCCH is separate from a resource set of another control channel, a channel structure of the group common PDCCH is different from that of another PDCCH, and the first processor 95 is further configured to: control the first transceiver 92 to transmit the group common PDCCH according to a predetermined channel structure of the group common PDCCH in the resource set of the group common PDCCH.

Specifically, the first processor 95 is further configured to: control the first transceiver 92 to notify the UE of a RNT value used for scrambling CRC of the group common PDCCH by high layer signaling, and transmit the group common PDCCH according to a predetermined DCI format added with the CRC scrambled by the RNTI value, in the resource set of the group common PDCCH.

Specifically, the group common PDCCH carries the information of a group of UEs, and the group of UEs includes at least one UE.

In FIG. 9, a bus architecture (represented by the first bus 91) may include any number of interconnected buses and bridges. Various circuits including one or more processors represented by the first processor 95 and storages represented by the first storage 96 are linked together by the first bus 91. The first bus 91 may also link various other circuits together, such as peripherals, voltage regulators, and power management circuits, as is known in the art. Therefore, no further description of them is given herein. The first bus interface 94 provides an interface between the first bus 91 and the first transceiver 92. The first transceiver 92 may be one element, or a plurality of elements, such as a plurality of receivers and transmitters, which provide a unit for communicating with various other devices over a transmission medium. Data processed by the first processor 95 is transmitted over a wireless medium via the antenna 93. Further, the antenna 93 also receives data and transmits the data to the first processor 95.

The first processor 95 is responsible for managing the first bus 91 and the normal processing, and can also provide various functions including timing, peripheral interfaces, voltage regulation, power management, and other control functions. The first storage 96 may be configured to store data used by the first processor 95 in performing operations.

Optionally, the first processor 95 may be a CPU, an ASIC, a FPGA, or a CPLD.

Figure 10:
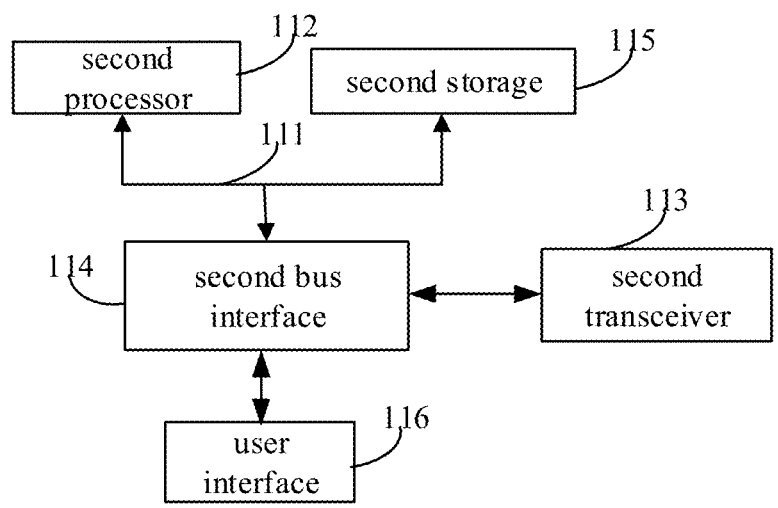
FIG. 10 shows a schematic structural view of a User Equipment (UE) according to an embodiment of the present disclosure.

As shown in FIG. 10, an embodiment of the present disclosure provides a User Equipment (UE), which includes a second bus 111, a second processor 112, a second transceiver 113, a second bus interface 114, a second storage 115 and a user interface 116.

The second processor 112 is configured to read a program in the second storage 115 and execute the following process:

controlling the second transceiver 113 to acquire a resource set of a base station for transmission of a group common PDCCH.

The second transceiver 113 is configured to receive and transmit data under the control of the second processor 112.

Specifically, the second processor 112 is further configured to: control the second transceiver 113 to acquire the resource set of the base station for transmission of the group common PDCCH by high layer signaling; or in a case that the resource set of the group common PDCCH overlaps with a resource set of a common downlink control channel, acquire the resource set of the base station for transmission of the common downlink control channel through a MIB message, and determine the resource set of the base station for transmission of the group common PDCCH.

Specifically, the resource set of the group common PDCCH overlaps with a resource set of another control channel, or is separate from a resource set of another control channel.

Specifically, the resource set of the group common PDCCH overlaps with a resource set of another control channel, a channel structure of the group common PDCCH is the same as a channel structure of another PDCCH, and the second processor 112 is further configured to: control the second transceiver 113 to detect and receive the group common PDCCH according to a predetermined DCI format of the group common PDCCH in the resource set of the group common PDCCH.

Specifically, that the resource set of the group common PDCCH overlaps with the resource set of another control channel specifically is: the resource set of the group common PDCCH overlaps with a resource set for transmission of a common downlink control channel configured by a MIB or a SIB.

Specifically, the second processor 112 is further configured to: control the second transceiver 113 to detect and receive the group common PDCCH according to the predetermined DCI format of the group common PDCCH in a resource set of the group common PDCCH on a first OFDM symbol of a time slot in which the group common PDCCH is transmitted.

Specifically, the resource set of the group common PDCCH is separate from a resource set of another control channel, a channel structure of the group common PDCCH is the same as a channel structure of another PDCCH, and the second processor 112 is further configured to: control the second transceiver 113 to detect and receive the group common PDCCH according to a predetermined DCI format of the group common PDCCH in the resource set of the group common PDCCH.

Specifically, the resource set of the group common PDCCH is separate from a resource set of another control channel, a channel structure of the group common PDCCH is different from that of another PDCCH, and the second processor 112 is further configured to: control the second transceiver 113 to detect and receive the group common PDCCH according to a predetermined channel structure of the group common PDCCH in the resource set of the group common PDCCH.

Specifically, the second processor 112 is further configured to: control the second transceiver 113 to acquire a RNTI value used for scrambling CRC of the group common PDCCH by high layer signaling; and detect and receive a predetermined DCI format of the group common PDCCH according to the RNTI value, in the resource set of the group common PDCCH, where the predetermined DCI format is added with a CRC scrambled by the RNTI value.

Specifically, the group common PDCCH carries the information of a group of UEs, and the group of UEs includes at least one UE.

In FIG. 10, a bus architecture (represented by the second bus 111) may include any number of interconnected buses and bridges. Various circuits including one or more processors represented by the second processor 112 and storages represented by the second storage 115 are linked together by the second bus 111. The second bus 111 may also link various other circuits together, such as peripherals, voltage regulators, and power management circuits, as is known in the art. Therefore, no further description of them is given herein. The second bus interface 114 provides an interface between the second bus 111 and the second transceiver 113. The second transceiver 113 may be one element, or a plurality of elements, such as a plurality of receivers and transmitters, which provide a unit for communicating with various other devices over a transmission medium. For example, the second transceiver 113 receives external data from other devices. The second transceiver 113 is configured to transmit data processed by the second processor 112 to other devices. Depending on the nature of the computing system, a user interface 116 may also be provided, such as a keypad, a display, a speaker, a microphone, a joystick, etc.

The second processor 112 is responsible for managing the second bus 111 and the normal processing, and runs a general operating system as described above. The second storage 115 may be configured to store data used by the second processor 112 in performing operations.

Optionally, the second processor 112 may be a CPU, an ASIC, a FPGA, or a CPLD.

It is noted that the terms "include", "contain", or any other variants thereof used in the present disclosure are intended to encompass a non-exclusive inclusion, such that a process, a method, an article, or a device including a series of elements only not include those elements, but also include other elements that are not explicitly listed, or elements that are inherent to such process, method, article, or device. Without further limitations, an element that is defined by the phrase "including a . . . " does not exclude the presence of additional identical elements in the process, method, article or device that includes said element.

The serial numbers of the above embodiments of the present disclosure are merely for the purpose of description, and do not indicate whether the embodiment is preferred or not.

Through the description of the above embodiments, a person skilled in the art can clearly understand that the method of the above embodiments can be implemented by means of software plus a necessary general hardware platform, and of course can also be implemented by means of hardware, but in many cases the former is a better implementation. Based on such understanding, the essential parts of the technical solution of the present disclosure, or in other words, the parts that make contribution to the related art, may be embodied in the form of a software product. The computer software product is stored in a storage medium (such as ROM/RAM, magnetic disk, and optical disk), and includes several instructions for causing a user equipment (which may be a cell phone, a computer, a server, an air conditioner, or a network device, etc.) to perform the methods described in various embodiments of the present disclosure.

Described above are optional embodiments of the present disclosure, and it should be noted that a person skilled in the art can also make several improvements and modifications without departing from the principles of the present disclosure, which will also fall within the scope of protection of the present disclosure.

What is claimed is:

1. A method for transmitting a downlink channel, comprising:
   notifying a User Equipment (UE) of a resource set for transmitting a group common physical downlink control channel (PDCCH);
   wherein notifying the UE of the resource set for transmitting the group common PDCCH specifically includes:
   on determining that the resource set for transmitting the group common PDCCH overlaps with a resource set of a common downlink control channel, notifying, through a main information block (MIB) message, the UE of the resource set for transmitting the common downlink control channel, thereby implicitly notifying the UE of the resource set for transmitting the group common PDCCH.

2. The method according to claim 1, wherein the resource set for transmitting the group common PDCCH overlaps with a resource set of another control channel, or is separate from a resource set of another control channel.

3. The method according to claim 2, wherein the resource set for transmitting the group common PDCCH overlaps with the resource set of another control channel, and a channel structure of the group common PDCCH is the same as a channel structure of another PDCCH; and the method further comprises:
   transmitting the group common PDCCH according to a predetermined downlink control information (DCI) format of the group common PDCCH in the resource set for transmitting the group common PDCCH.

4. The method according to claim 3, wherein transmitting the group common PDCCH according to the predetermined downlink control information (DCI) format of the group common PDCCH in the resource set for transmitting the group common PDCCH specifically includes:
   transmitting the group common PDCCH according to the predetermined DCI format of the group common PDCCH in a resource set for transmitting the group common PDCCH on a first Orthogonal Frequency Division Multiplexing (OFDM) symbol of a time slot in which the group common PDCCH is transmitted.

5. The method according to claim 2, wherein the resource set for transmitting the group common PDCCH is separate from the resource set of another control channel, and a channel structure of the group common PDCCH is the same as a channel structure of another PDCCH; and the method further comprises:
   transmitting the group common PDCCH according to a predetermined downlink control information (DCI) format of the group common PDCCH in the resource set for transmitting the group common PDCCH.

6. The method according to claim 5, further comprising:
   notifying the UE of a radio network temporary identifier (RNTI) value used for scrambling the cyclic redundancy check (CRC) of the group common PDCCH by high layer signaling; and
   transmitting the group common PDCCH according to the predetermined DCI format of the group common PDCCH in the resource set for transmitting the group common PDCCH specifically includes:
   transmitting the group common PDCCH according to a predetermined DCI format added with the CRC scrambled by the RNTI value, in the resource set for transmitting the group common PDCCH.

7. The method according to claim 2, wherein the resource set for transmitting the group common PDCCH is separate from the resource set of another control channel, and a channel structure of the group common PDCCH is different from that of another PDCCH; and the method further comprises:
   transmitting the group common PDCCH according to a predetermined channel structure of the group common PDCCH in the resource set for transmitting the group common PDCCH.

8. The method according to claim 1, wherein the group common PDCCH carries the information of a group of UEs, and the group of UEs comprises at least one UE.

9. A device for transmitting a downlink channel, comprising: a processor, a storage, and a computer program which is stored on the storage and capable of running on the processor, wherein when the computer program is executed by the processor, step in the method for transmitting the downlink channel according to claim 1 are implemented.

10. The method according to claim 1, wherein the resource set for transmitting the group common PDCCH overlapping with the resource set of the common downlink control channel is that the resource set for transmitting the group common PDCCH overlaps with, a resource set for transmitting a common downlink control channel configured by the main information block (MIB) message.

11. A method for transmitting a downlink channel, comprising:
    acquiring a resource set of a base station for transmitting a group common physical downlink control channel (PDCCH);
    wherein the acquiring the resource set of the base station for transmitting the group common PDCCH specifically includes:
    on determining that the resource set for transmitting the group common PDCCH overlaps with a resource set of a common downlink control channel, acquiring, through a main information block (MIB) message, the resource set of the base station for transmitting the common downlink control channel, and determining the resource set of the base station for transmitting the group common PDCCH.

12. The method according to claim 11, wherein the resource set for transmitting the group common PDCCH overlaps with a resource set of another control channel, or is separate from a resource set of another control channel.

13. The method according to claim 12, wherein the resource set for transmitting the group common PDCCH overlaps with the resource set of another control channel, and a channel structure of the group common PDCCH is the same as a channel structure of another PDCCH; and the method further comprises:
    detecting and receiving the group common PDCCH according to a predetermined downlink control information (DCI) format of the group common PDCCH in the resource set for transmitting the group common PDCCH.

14. The method according to claim 13, wherein the detecting and receiving the group common PDCCH according to the predetermined DCI format of the group common PDCCH in the resource set for transmitting the group common PDCCH specifically includes:
detecting and receiving the group common PDCCH according to the predetermined DCI format of the group common PDCCH in a resource set for transmitting the group common PDCCH on a first Orthogonal Frequency Division Multiplexing (OFDM) symbol of a time slot in which the group common PDCCH is transmitted.

15. The method according to claim 12, wherein the resource set for transmitting the group common PDCCH is separate from the resource set of another control channel, and a channel structure of the group common PDCCH is the same as a channel structure of another PDCCH; and the method further comprises:
detecting and receiving the group common PDCCH according to a predetermined downlink control information (DCI) format of the group common PDCCH in the resource set for transmitting the group common PDCCH.

16. The method according to claim 15, further comprising:
acquiring a radio network temporary identifier (RNTI) value used for scrambling the cyclic redundancy check (CRC) of the group common PDCCH by high layer signaling; and
wherein the detecting and receiving the group common PDCCH according to the predetermined DCI format of the group common PDCCH in the resource set for transmitting the group common PDCCH specifically includes:
detecting and receiving a predetermined DCI format of the group common PDCCH according to the RNTI value, in the resource set for transmitting the group common PDCCH, wherein the predetermined DCI format is added with a CRC scrambled by the RNTI value.

17. The method according to claim 12, wherein the resource set 4 for transmitting the group common PDCCH is separate from a resource set of another control channel, and a channel structure of the group common PDCCH is different from that of another PDCCH; and the method further comprises:
detecting and receiving the group common PDCCH according to a predetermined channel structure of the group common PDCCH in the resource set for transmitting the group common PDCCH.

18. The method according to claim 11, wherein the group common PDCCH carries the information of a group of UEs, and the group of UEs comprises at least one UE.

19. A device for transmitting a downlink channel, comprising: a processor, a storage, and a computer program which is stored on the storage and capable of running on the processor, wherein when the computer program is executed by the processor, step in the method for transmitting the downlink channel according to claim 11 are implemented.

20. The method according to claim 11, wherein the resource set for transmitting the group common PDCCH overlapping with the resource set of the common downlink control channel is that the resource set for transmitting the group common PDCCH overlaps with, a resource set for transmitting a common downlink control channel configured by the main information block (MIB) message.

* * * * *